United States Patent [19]

Gutner

[11] 4,004,306
[45] Jan. 25, 1977

[54] BED CANOPY FRAME

[76] Inventor: Kenneth H. Gutner, 3285 Dato, Highland Park, Ill. 60035

[22] Filed: Nov. 12, 1975

[21] Appl. No.: 631,042

[52] U.S. Cl. .................................. 5/362; 5/113; 135/5.2; 403/361

[51] Int. Cl.² .................................. A47C 29/00

[58] Field of Search ............ 5/113, 362; 403/313, 403/361, 375; 135/5.1, 5.2; 248/165, 314

[56] References Cited

UNITED STATES PATENTS 1,764,226  6/1930  Rennack .................. 248/165 X
3,237,217  3/1966  Desneux .................. 5/362
3,741,225  6/1973  Gunter .................... 5/362

Primary Examiner—Casmir A. Nunberg
Attorney, Agent, or Firm—Tilton, Fallon, Lungmus, Chestnut & Hill

[57] ABSTRACT

A bed canopy frame having channel shaped resilient plastic longitudinal members and hollow metal cross rods wherein the plastic members have integral receptacles equipped with projections to stabilize the connection between the cross and longitudinal members.

5 Claims, 6 Drawing Figures

U.S. Patent  Jan. 25, 1977  4,004,306
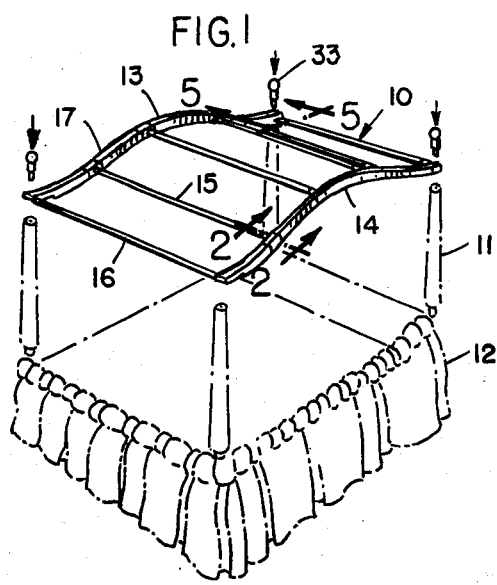
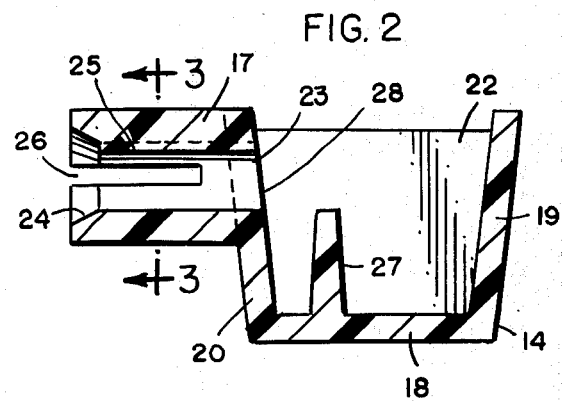
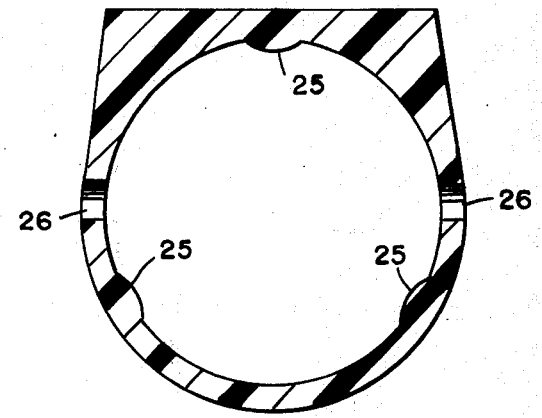
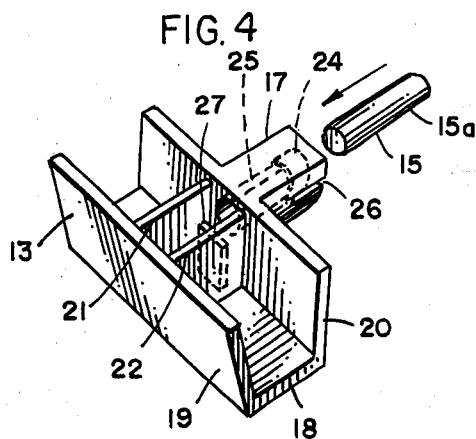
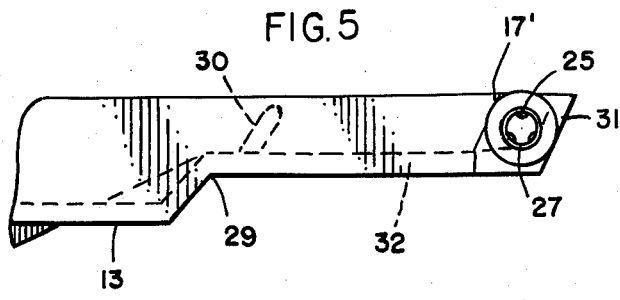
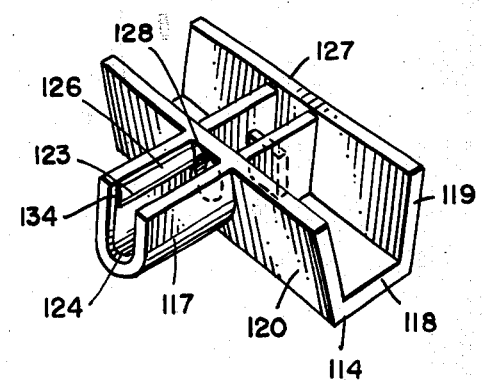

4,004,306

BED CANOPY FRAME

BACKGROUND AND SUMMARY OF INVENTION

The instant invention is an improvement on the canopy frame described in my earlier U.S. Pat. No. 3,741,225, which in turn was an improvement on my prior U.S. Pat. No. 3,311,118. In the U.S. Pat. No. 3,311,118 patent, the frame was constructed of metal elements equipped with clips and the like for interconnection. The U.S. Pat. No. 3,741,225 patent provided the improvement wherein the longitudinal arched members were made of plastic and telescopically interconnected and equipped with certain integral receptacles for connecting the cross-tie members.

In the course of putting the plastic canopy frame into volume production, I have found it advantageous to change certain features, notably in the connecting receptacles which bring about advantages in manufacture, installation, and usage. Most significantly, the new structure in the canopy frame develops optimum rigidity and integrity.

The new construction is especially adapted for employing cross members which are hollow metal tubes or rods and which may differ dimensionally one from another. Such cross members are advantageous in being lighter weight, and less expensive, but because of these very advantages, may suffer from the above mentioned lack of dimensional identity, one to another. Through the use of a receptacle in combination with a novel integral upstanding projection, I am able to provide a canopy frame having the advantages listed above but without the expected concurrent disadvantages.

DETAILED DESCRIPTION OF INVENTION:

The invention is described in conjunction with the accompanying drawing, in which:

FIG. 1 is a perspective view of the inventive canopy frame shown associated with a bed in phantom line;

FIG. 2 is an enlarged sectional view of a cross-member receptacle such as would be seen generally along the line 2—2 of FIG. 1;

FIG. 3 is an enlarged sectional view along the line 3—3 of FIG. 2;

FIG. 4 is a perspective, fragmentary view of the FIG. 2 receptacle associated with a cross member;

FIG. 5 is an enlarged fragmentary sectional view taken along the line 5—5 of FIG. 1; and FIG. 6 is a fragmentary perspective view of a modified form of the invention.

In the illustration given, the numeral 10 designates generally the inventive frame which is seen to be installed on upstanding bedposts as at 11. The bedposts 11 are provided at the four corners of the frame of the usual bed 12.

The frame 10 includes a pair of telescoping, longitudinally extending members 13 and 14 of the type described in greater detail in my earlier U.S. Pat. No. 3,741,225. Express reference is made to that patent for details of construction not given herein.

The longitudinally extending members 13 and 14 are connected by a plurality of cross-tie members 15 and 16, with the cross-tie members 16 being at the ends of the frame 10. However, all of cross-tie members 15 and 16 are received in similarly-shaped receptacles 17 which can be seen in greater detail in FIG. 2.

The receptacle 17 as seen in FIG. 2 is an integral part of a portion of the channel-shaped longitudinal member 14. The channel-shaped member 14 is made up of a bottom wall 18 integral with upstanding sidewalls 19 and 20. The sidewalls 19 and 20 are interconnected adjacent each side of the receptacle 17 by means of integral cross walls 21 and 22 (see FIG. 4).

Now referring again to FIG. 2, it will be noted that the receptacle 17 is equipped with a through bore 23 which communicates with the interior of the channel shaped longitudinal member 14. In proceeding from left to right along the bore 23, it will be noted that there is an initial flared portion 24 which facilitates the entry of the rod 15 (compare FIG. 4). In proceeding further to the right along the through bore 23, a plurality of circumferentially spaced apart, inwardly projecting ribs 25 are provided (see FIG. 3). These facilitate the receipt of an cross-tie member 15 which may be a hollow tube rolled on itself and with a butt fit as at 15a (see FIG. 4). As in my earlier U.S. Pat. No. 3,741,225, the receptacle 17 is provided with slot means as at 26 to accommodate the cross members.

Within the general channel shapes of the longitudinal members 13 and 14, I provide upstanding projections 27 each of which perform an advantageous locking function relative to its associated cross tie member 15. The integral projection 27 has a height sufficient to slightly overlap (by the order of a few thousandths of an inch) the lower margin of the opening 28 defined by the bore 23 in passing through the wall 20 (see FIG. 2). Thus, when the cross tie member 15 is inserted through the receptacle to a position adjacent the wall 19, it causes the projection 27 to flex slightly to the right in FIG. 2 and therefore applies a bias or pressure to the rod 15 (in combination with the bore 23 of the receptacle 17 and the ribs 25 therein) and thereby provides an advantageous immobilizing or stabilizing function.

As can be seen in FIG. 5, the end receptacle 17' is the same as the other receptacles. However, the channel shaped longitudinal member 18 is of reduced height (by virtue of the shoulder 29). There is provided however, a cross rib 30 which, in combination with the end wall 31, stabilize both the receptacle 17' and the portion of the member 13 about the opening 32 — which receives the finial 33 — see FIG. 1.

Reference is now made to a modified form of receptacle as depicted in FIG. 6. There, reference numerals are employed which are similar to those of the embodiment shown in FIGS. 1–5 but increased in value by 100. Thus, the portion of the longitudinal member is designated 114 and is equipped with an integral receptacle as at 117. Again, there is a bore 123 and an upstanding projection 127. The portion of the longitudinal member 114 which includes the opening 128 within the wall 120, the bottom wall 118 and the other sidewall 119 are all identical to that of the previously described embodiment, the difference residing in the character of the bore 123. In essence, I provide a single slot means as at 126 in the upper margin of the bore 123 — as contrasted to the two side slot means 28 of the embodiment of FIGS. 1–5. Further, I provide longitudinally extending shoulders as at 134 which serve to confine the associated cross tie member 15. However, I do retain the flare as at 124.

As a specific embodiment, the channel shaped longitudinal member 13 or 14, as the case may be, has an overall horizontal dimension of 1 inch at the top tapering to 13/16 inch at the bottom and an overall height of ¾ inch, the wall thickness being approximately 3/32 inch. The diameter of the bore 23 or 123 is approximately ¼ inch with the projection 27 or 127 overlapping the bottom margin of the bore by a minor fraction of an inch, i.e., of the order of 1/32 inch. The projection 27 or 127 has a width of about 3/32 inch, a thickness of approximately 1/16 inch and a height of about 11/32 inch. The ribs 25 or 125 are spaced apart 120° and also project into the bore 23 only a short distance, i.e., about 0.010–0.015 inch.

I claim:

1. A canopy bed frame comprising two arched longitudinal members and a plurality of relatively rigid lateral members adapted to be interconnected adjacent the ends thereof to form a generally ladder-like rectangular frame, said longitudinal members being equipped with receptacles for receiving said lateral members in releasably adjustable fashion, each longitudinal member being constructed of resilient plastic material and having bottom and side walls to provide an open-topped channel shape in cross section, each receptacle being a block integrated with one side wall of an associated longitudinal member and having a bore receiving its associated lateral member, said lateral members having a circular cross section, said bottom wall being equipped with an integral upstanding projection aligned with said bore and slightly overlapping the same whereby said projection flexes to apply an upward bias to a lateral member passing by said projection to stabilize said lateral member in position.

2. The structure of claim 1 in which said lateral members are hollow tubes.

3. The structure of claim 1 in which said bore is equipped with a plurality of circumferentially spaced apart, longitudinally extending integral ribs.

4. The structure of claim 1 in which slot means are provided in said block communicating with said bore to permit bore enlargement upon receipt of said lateral member.

5. The structure of claim 4 in which said slot means includes a single slot in the top of said block, said bore being equipped with a longitudinally extending shoulder below said slot to clamp said lateral member.

* * * * *